April 10, 1928.
A. C. PARKER
1,665,321
DECORATING APPARATUS
Filed March 25, 1926
3 Sheets-Sheet 1
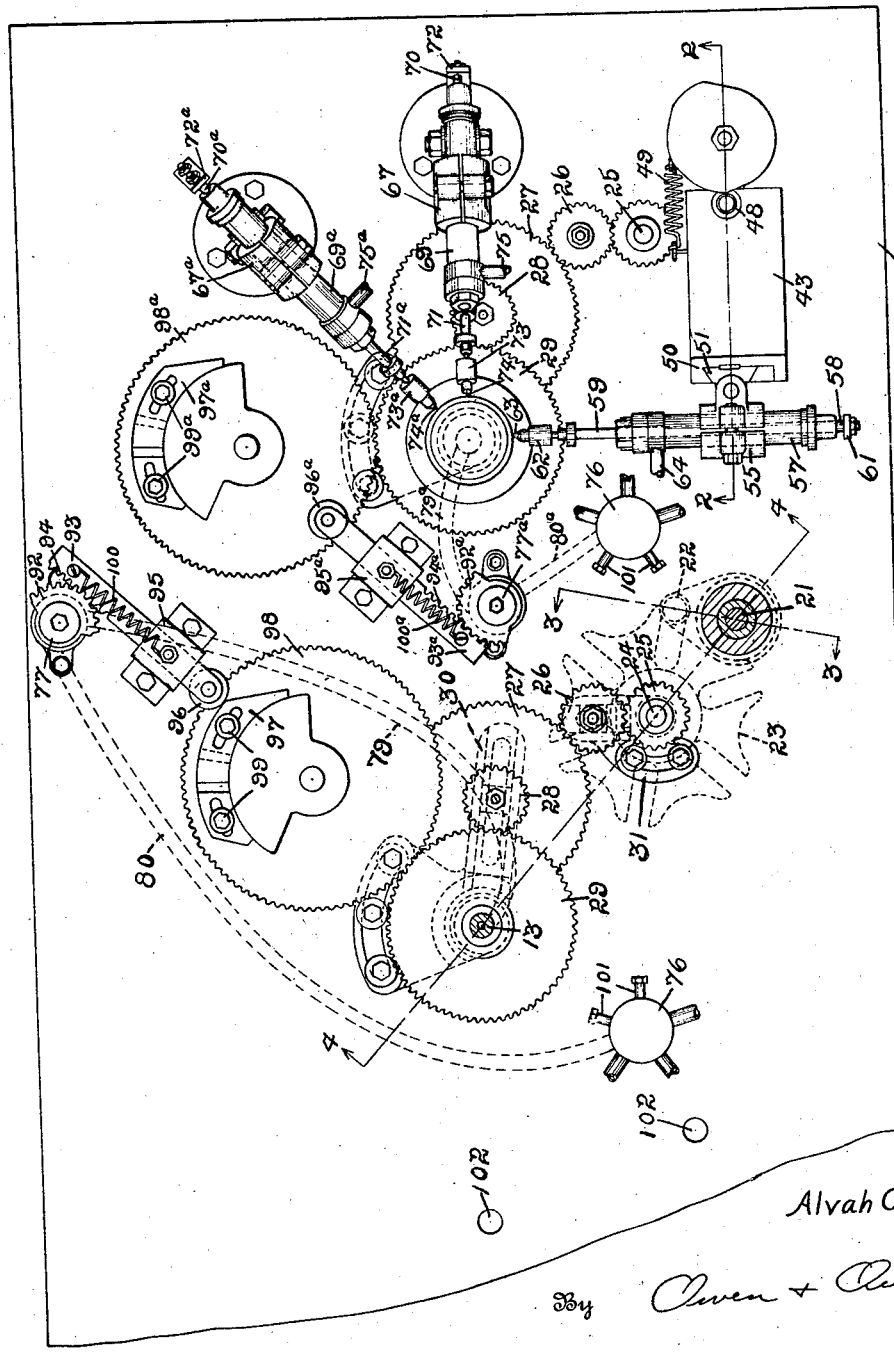
Inventor
Alvah C. Parker
By Owen + Owen
Attorneys

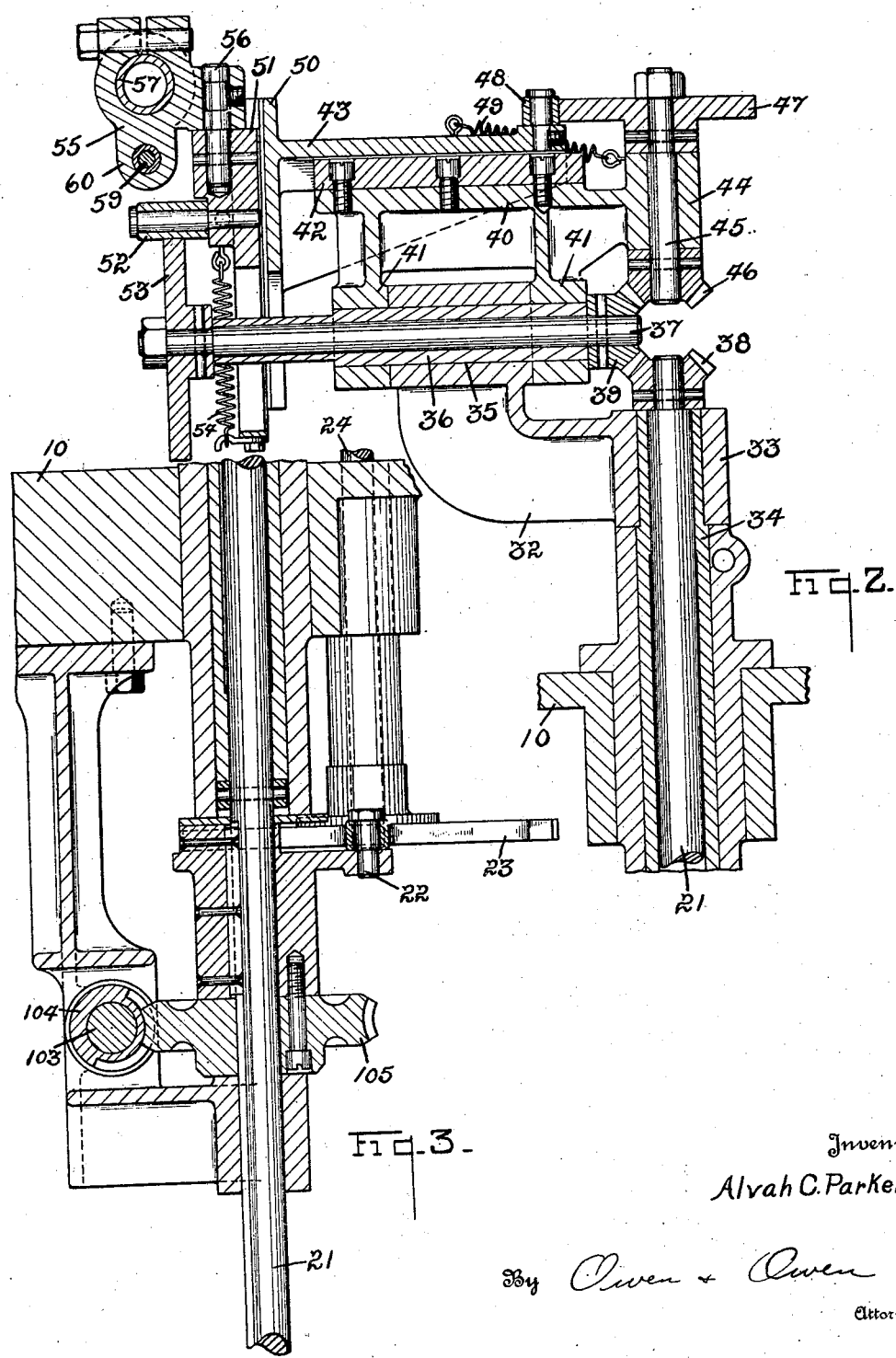

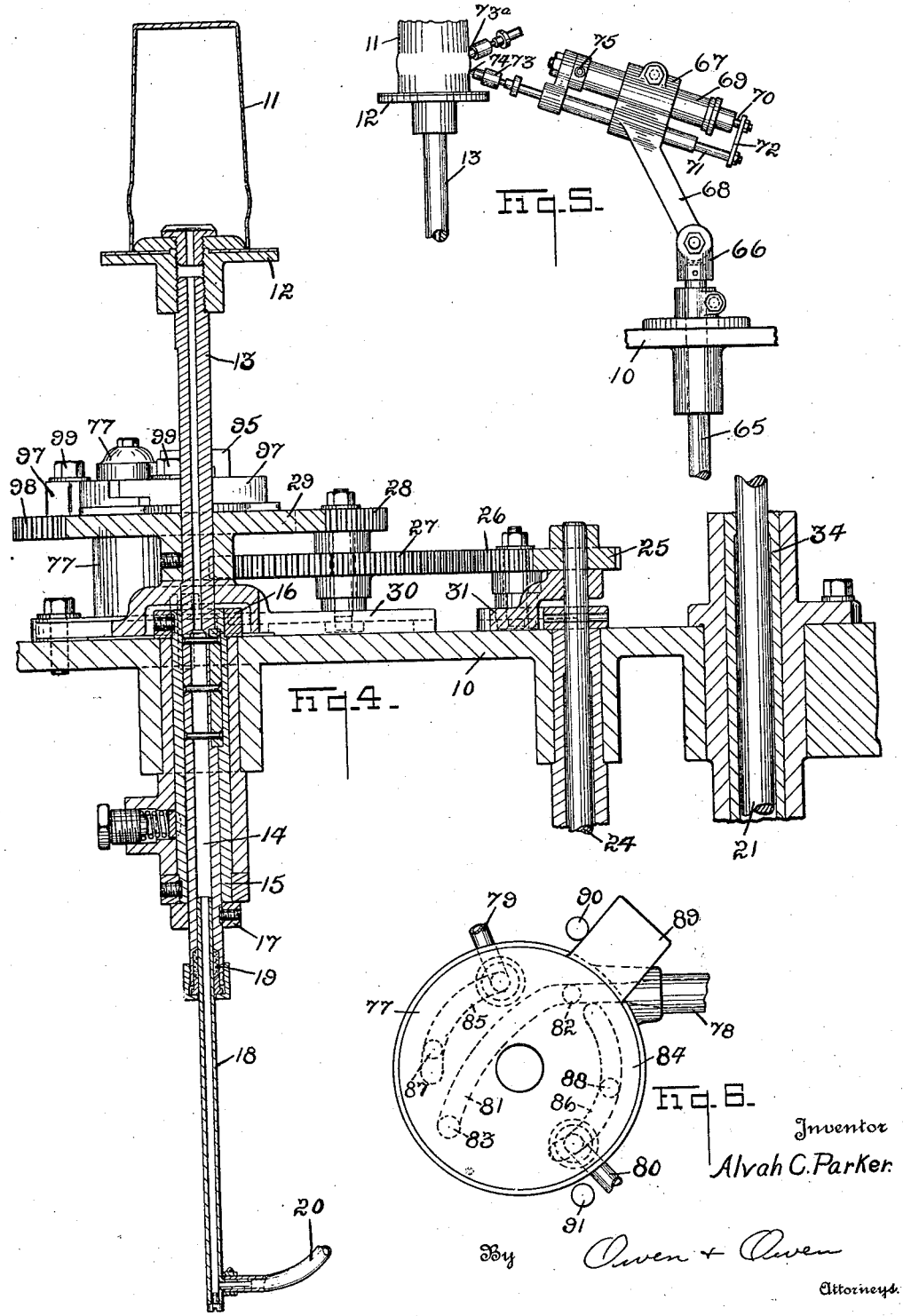

Patented Apr. 10, 1928.

1,665,321

UNITED STATES PATENT OFFICE.

ALVAH C. PARKER, OF TOLEDO, OHIO, ASSIGNOR TO THE LIBBEY GLASS MANUFACTURING COMPANY, OF TOLEDO, OHIO, A CORPORATION OF OHIO.

DECORATING APPARATUS.

Application filed March 25, 1926. Serial No. 97,255.

My invention relates to decorating apparatus, and the apparatus is particularly adapted for forming patterns in the coating on glassware preparatory to etching the same. The purpose of my invention is to simplify the necessary apparatus and render it more efficient. Details of the invention will appear as the description proceeds.

In the accompanying drawings, forming a part of this specification, Figure 1 is a partial plan view, with parts broken away, showing apparatus embodying my invention; Figs. 2, 3 and 4 are sections on the lines 2—2, 3—3 and 4—4, respectively, on Fig. 1; Fig. 5 is a side elevation of a detail; and Fig. 6 is a plan of the air control valve.

I have shown the apparatus mounted on a table 10, and, by way of illustration, a glass tumbler 11 is shown in position on chuck plate 12. The chuck plate is supported on the upper end of spindle 13 having a hollow 14 therethrough by which air may be exhausted from the interior of the tumbler. The spindle is mounted in a sleeve 15 which has fixed thereon an upper collar 16 adapted to rest upon the upper side of table 10 while a collar 17 at the lower end of the sleeve prevents the spindle from rising with respect to the table. A vacuum pipe 18 enters the lower end of the central bore 14 of spindle 13, and a stuffing box 19 prevents leakage around vacuum pipe 18. Pipe 18 is connected by means of a flexible hose 20 with exhausting apparatus, as will be explained later.

An operating shaft 21 is mounted vertically in the table, and is driven continuously in a manner which will be described later. A crank pin 22 is attached to shaft 21, and drives intermittently a star wheel 23 fixed on the lower end of a vertical shaft 24. Gear 25 is fixed on the upper end of shaft 24 above table 10 and meshes with a pinion 26 which in turn drives gear 27 having a comparatively small gear 28 attached to its upper side. The small gear 28 is in mesh with a relatively large gear 29 on spindle 13. In this manner spindle 13 is driven from shaft 24. In order that the relative speed of the spindle may be varied and the length of successive intermittent steps may be adjusted, gears 27 and 28 are mounted in a slideway upon an adjustable member 30 and pinion 26 is mounted upon a bracket 31 which may be adjusted about shaft 24, so that gears 27 and 28 may be removed and other gears of desired dimensions used in place thereof.

Above the table is a bracket 32 having a supporting sleeve 33 fixed upon bearing sleeve 34 which surrounds shaft 21. Bracket 32 has a horizontal bore 35 receiving a bearing sleeve 36 for a horizontal cam shaft 37. A bevel gear 38 on the upper end of shaft 21 is in mesh with a bevel gear 39 on the end of shaft 37.

Above shaft 37 there is a bracket 40 having lugs 41 adjustably fixed upon bearing sleeve 36. Bracket 40 is provided with a slideway 42 for a horizontal slide 43, and also has a bearing 44 for a vertical cam shaft 45. A beveled gear 46 on the lower end of shaft 45 meshes with gear 39 on shaft 37. A cam 47 is provided on the upper end of shaft 45. Horizontal slide 43 is provided with a cam roller 48 which is normally held against cam 47 by means of a spring 49.

The other end of slide 43 is provided with a vertical slideway 50 wherein there moves a vertical slide 51. Slide 51 has a cam roller 52 adapted to rest upon a cam 53 upon the end of shaft 37. Normally, the weight of slide 51 and the parts carried thereby will be sufficient to keep roller 52 in contact with cam 53, but a spring 54 may be added if desired in order to assist gravity in maintaining this contact.

A bracket 55 is adjustably mounted upon the upper end of slide 51 by means of a pin 56. Bracket 55 carries a cylinder 57 adjustably mounted therein. Cylinder 57 is provided with a piston rod 58 connected with a piston, not shown, within the cylinder. There is a needle or stylus rod 59, supported by guiding portions 60, substantially parallel with piston rod 58. A member 61 connects rods 58 and 59 so that they move together. On the end of rod 59 there is a head 62 which carries one or more needles or stylus points 63. A vacuum pipe 64 leads into the end of cylinder 57 and actuates the cylinder at proper times.

Additional decorating members may be mounted in the manner shown in Figure 5. A vertical shaft 65 is mounted adjustably in the table and is provided with a cap 66. A bracket 67 has an arm 68 pivoted in the cap. A cylinder 69 is adjustably mounted within bracket 67 and is provided with a piston rod 70 connected to a needle rod 71 by means of a member 72. Rod 71 carries a head 73 in which is mounted one or more needle or stylus points 74. A vacuum pipe 75 leads into the end of the cylinder. There is shown in plan view on Fig. 1 a duplication of the above described additional decorating device, designated by reference characters 67ª and 69ª to 75ª, inclusive, applied to the parts corresponding to those described above. As many of these additional fixed decorating members as desired may be used in connection with the apparatus heretofore described, two being shown merely by way of example.

A manifold 76 may be provided to be connected to the various cylinders described above. A valve 77 is provided for controlling the connections to the vacuum tank or pump. The valve may be operated by hand or by any suitable mechanism such as described below. Any suitable valve may be used, there being shown in Fig. 6 a valve which I have found suitable. Leading to this valve is a pipe 78 from a suitable vacuum tank or pump and a pipe 79 connects the valve with hose 20 and a pipe 80 connects the valve with manifold 76. A passageway 81, provided in a stationary portion of the valve, leads from pipe 78 and has openings 82 and 83 leading to an oscillatable disk 84. The disk 84 is provided with slots 85 and 86. Slot 85 is adapted, when in one position, to connect pipe 79 with opening 82 and, when in another position, to connect pipe 79 with an opening 87 which leads to the outside atmosphere. Slot 86 is adapted to connect pipe 80 alternately with opening 83 and with an opening 88 leading to the outside atmosphere. A projection 89 from disk 84 is adapted to contact alternately stop pins 90 and 91 (Fig. 6) and permit the oscillation of the disk.

As stated above, this valve may be operated by hand, but in the preferred form there is shown automatic means for this purpose. A segmental gear 92 is attached to disk 84. A rack bar 93 having a rack 94 in mesh with segmental gear 92 is mounted within a guide 95, and has a cam wheel 96 adapted to contact with cam 97 on a cam disk 98, which is larger than, and in mesh with, gear 29. The cam is mounted upon the disk adjustably by means of bolt and slot connections 99. A spring 100 may be provided for urging the rack bar towards one extreme position. The bar is moved at proper times in the other direction by cam 97.

In the apparatus disclosed in Fig. 1 the needle-carrying members and actuating device therefor are removed from the device shown at the left. The driving connections for the chuck plate and the cam driven needle or stylus points is the same for both sets of apparatus shown, but the location of the fixed stylus points and of the vacuum controlling gearing is somewhat different, in order to aid in a compact arrangement of the parts. Members of the air control devices for the apparatus at the right of Fig. 1 are designated by reference characters 92ª to 100ª, inclusive, applied to the same respective parts as in the description above.

As stated above, as many of the fixed decorating members as desired may be used. The manifold is shown provided with five outlets for various decorating members. If fewer decorating members are used, the additional holes may be stopped up, as by plugs 101. As many places 102 (Fig. 1) for mounting fixed decorating members on the table may be provided as desired.

A main drive shaft 103, extending longitudinally beneath the table, may drive as many sets of decorating devices as desired, there being for each set a worm 104 in engagement with a worm wheel 105 upon the drive shaft 21.

The operation of the device will be fairly apparent from the above description, but for convenience will be briefly described as follows:

An article 11, shown as a tumbler, is placed upon the chuck 12 while the valve disk 84 is in the position shown in Fig. 6 and while the rack bar is being held in the position shown at the left of Fig. 1 by cam 97. In this position, the vacuum tank or pump is not connected to the chuck or to the various cylinders. There are springs, not shown, within the cylinders, which retract the needle or stylus points when the vacuum is broken. After the article has been put in position, cam wheel 96 runs down off of cam 97 and connects pipe 20 with pipe 78, which results in evacuation beneath tumbler 11 and holds it firmly upon plate 12. Immediately thereafter, pipe 70 is connected to the various cylinders through pipe 80 and the manifold, and thereby the various needles are driven forward into engagement with the tumbler.

The various devices are set at the desired angles so as to contact the tumbler at desired elevations and at proper angles to the surface of the glass. Where the glass is provided with a bulge 106, as shown in the drawings, and lines are to be placed upon the tumbler at the top and bottom of this bulge, it is desirable to mount the fixed needle points as shown in Fig. 5, so that they will be substantially perpendicular to the surface of the glass where they come in contact with it. In the construction shown, stylus points 63 are adapted to contact the glass midway between fixed points 73 and 73ª, and apply a pattern to this portion of the tumbler. The cams may be shaped to apply the desired pattern. The gears are so related, as will be readily seen, that cam 47 and 53 make a complete revolution at each revolution of shaft 21, and the tumbler is moved one step forward during each such revolution, so that stylus points 63 are moved through a pattern determined by the shapes of cams 47 and 53 during each successive rest period of the tumbler. By choosing proper dimensions for gears 27 and 28 the tumbler may be given a desired number of rest periods during one revolution thereof. It will be readily seen that the tumbler will be in precisely the same position at the conclusion of the final rest period that it was in at the start of the first rest period, and therefore, if rotation of the tumbler is continued a little more than one complete revolution, the various stylus points will follow in precisely the tracks they made during the first revolution. The dimension of gear 98 is so chosen that there will be a little over one complete revolution of gear 29, and consequently of the tumbler, while cam 97 is out of contact with roller 96. After this complete revolution of the tumbler, cam 97 actuates rack bar 93 and through it the vacuum control valve. When the valve turns from operative position towards the position in which it is shown in Fig. 6, the vacuum is broken first in pipe 80 and the connections to the various stylus points, so that these points are withdrawn slightly before the vacuum is broken within the tumbler. The operative may remove the tumbler after the vacuum has been broken within it, and replace it with another tumbler to be decorated, and the process will be repeated.

One operative may feed several of these devices. In the construction shown, the controlling cams 97 are so located that they will operate alternately and the operative may feed the two devices in succession. As will be seen from the length of cams 97, it will be readily possible to so locate them that the operative may take care of more than two of the decorating devices. This feature will be arranged as desired in view of the character of the design and the rapidity of the operation, etc.

It will be readily understood that various mechanical features may be varied within obvious limitations, and that the precise form of apparatus herein disclosed is shown by way of illustration only, and the scope of the invention is defined by the appended claims.

What I claim is:

1. In apparatus of the character described, a bracket having a slideway therein, a slide mounted for reciprocation in said slideway, said slide having a slideway therein at right angles to the first said slideway, a carrier mounted for reciprocation in the second said slideway, and stylus points carried by said carrier, shafts mounted parallel with said slideways, gears connecting said shafts for rotation, and a cam on each of said shafts, the cams being in position to operate the slide and carrier respectively.

2. In apparatus of the character described, a bracket having a slideway therein, a slide mounted for reciprocation in said slideway, said slide having a slideway therein at right angles to the first said slideway, a carrier mounted for reciprocation in the second said slideway, and stylus points carried by said carrier, a rotatable support for an article in operating relation to said stylus points, and means for rotating said article support and reciprocating said slide and carrier in timed relation to each other.

3. In apparatus of the character described, a rotatable vacuum chuck adapted to hold a glass article to be decorated, means for imparting a step by step rotation to said chuck, a bracket having a horizontal slideway therein, a slide in the slideway, said slide being provided with a vertical slideway, a carriage mounted for reciprocation in said vertical slideway, a holder mounted for substantially horizontal reciprocation in said carriage, stylus points on said holder adapted to contact an article on said chuck in one position of said holder, a vertical shaft, a cam on said shaft adapted to reciprocate said slide, a horizontal shaft geared to said vertical shaft, a cam on said horizontal shaft beneath said carriage and a roller on said carriage in position to rest on the last said cam, said roller being elongated so as to continue to rest on said cam when the slide is reciprocated horizontally.

In testimony whereof, I have hereunto signed my name to this specification.

ALVAH C. PARKER.